(No Model.)
W. HECKERT & W. P. ROWLAND.
PROCESS OF AND APPARATUS FOR MAKING GAS.
No. 527,789. Patented Oct. 23, 1894.
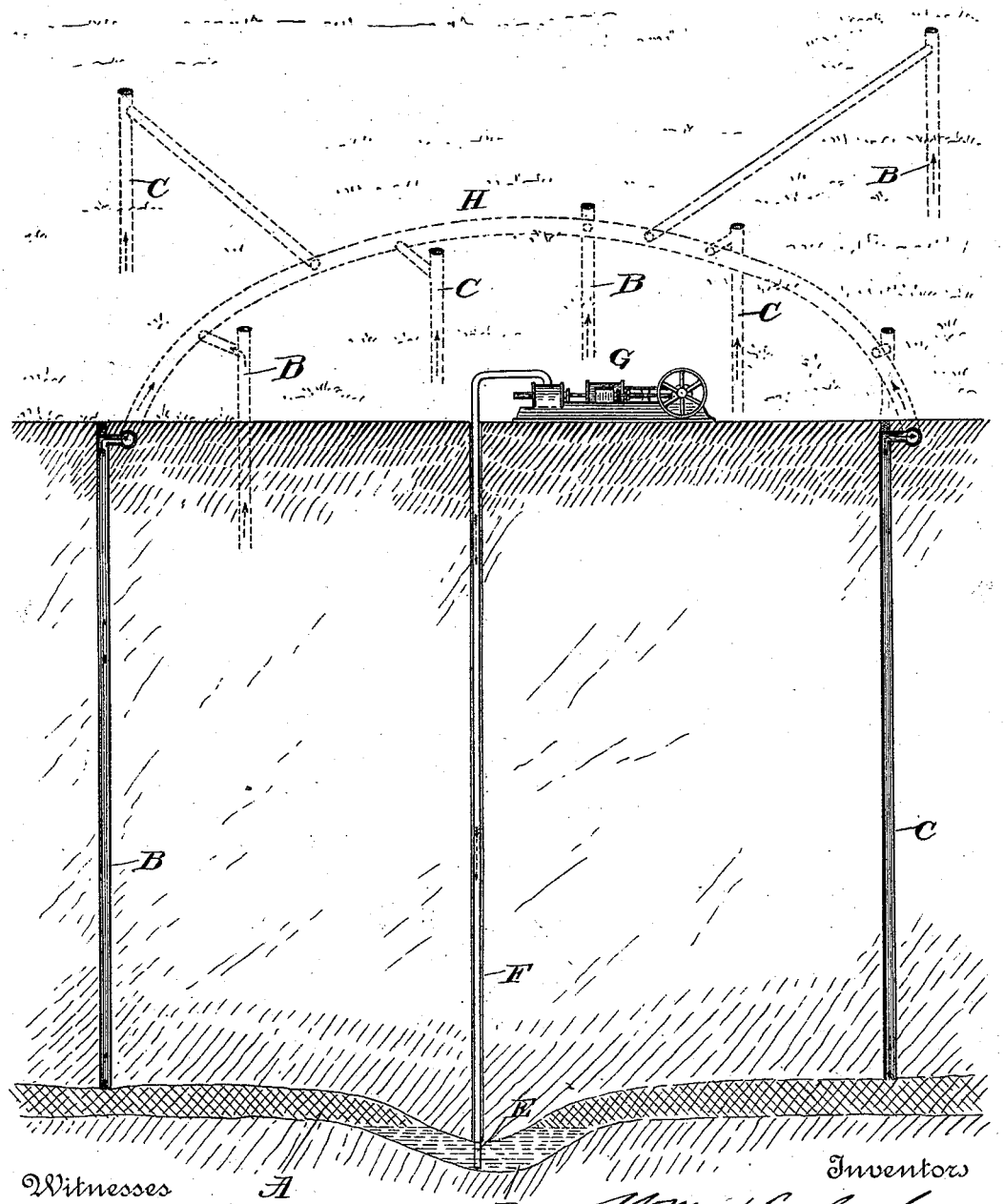

United States Patent Office.

WILLIAM HECKERT AND WILLIAM P. ROWLAND, OF FINDLAY, OHIO.

PROCESS OF AND APPARATUS FOR MAKING GAS.

SPECIFICATION forming part of Letters Patent No. 527,789, dated October 23, 1894.

Application filed February 9, 1894. Serial No. 499,623. (No model.)

*To all whom it may concern:*

Be it known that we, WILLIAM HECKERT and WILLIAM P. ROWLAND, citizens of the United States, residing at Findlay, in the county of Hancock and State of Ohio, have invented certain new and useful Improvements in Processes of and Apparatus for Making Gas; and we do hereby declare the following to be a full, clear, and exact description of the invention, such as will enable others skilled in the art to which it appertains to make and use the same.

Our invention relates to an improvement in the art of manufacturing gas, and has for its object the utilization of oil and gas wells for the production of artificial gas.

The invention consists in the process and apparatus hereinafter described, and defined in the appended claims.

The accompanying drawing illustrates a vertical sectional view of an oil field, showing wells and diagrammatically illustrating their connection with a gas main or distributer.

A indicates a vein or stratum of oil-bearing rock, and B and C indicate oil wells bored from the surface to the rock A.

D indicates a depression or "oil pocket" in the vein of rock, into which the lower end of the well or air tube E, of a well F, projects. The upper or surface end of the tube E, is connected with an air compressor G, of any suitable construction. The upper ends of the tubes of the several wells B and C, are suitably connected with a gas main H, from which the gas may be distributed.

The air from the compressor G, is forced downwardly through the tube E, and thence through or in contact with the oil contained in the pocket D, from whence it passes through the vein or channel A, to the several wells B and C, and thence upwardly to the main H.

By the passage of the air through the oil, and the gas-bearing channels or veins of rock the air is thoroughly carbureted and thus converted into an illuminating gas.

It is our purpose to utilize such wells as have been "worked out" or so reduced as to be practically exhausted, although still containing appreciable quantities of oil or natural gas; and, by forcing the air from a compressor through the veins or passages of such wells, we not only produce an artificial gas of good quality, but also agitate the oil and force it toward the bottoms of the wells where it may flow again or rise sufficiently in the wells to be within reach of pumps. The suction pumps used for both oil and gas wells exert a force only sufficient to relieve the well of atmospheric pressure to allow the expansion or natural pressure of the gas to raise it to a pumping level. Thus only a part of the gas or oil contained in a well is obtained. To obtain all requires that a vacuum be formed above the normal level of the oil or gas, which has been found to be impracticable. By the use of our improved process, however, any required pressure may be exerted to raise or force the oil and gas out, and the space thus formed is filled with air, which by its filtration through the oily passages from the bottom of the well where it enters, to the various discharge wells throughout the oil and gas field whence it finds its escape, is thoroughly carbureted, and converted into artificial gas.

It will be apparent that our process and apparatus impart value to oil and gas wells which, owing to small or non-paying production have become abandoned, and that we utilize their contained oil and gas which would otherwise be lost.

Having thus fully described our invention, what we claim as new, and desire to secure by Letters Patent of the United States, is—

1. The hereinbefore described method of producing artificial gas consisting in forcing air downwardly through a tube or other conduit to the level of an oil-bearing vein or stratum of rock, and thence along said vein or stratum to carburet the air, and then conducting the resultant gas upwardly to a main or distributer through pipes or conduits located at different points and connected to said vein or stratum, substantially as described.

2. The herein described method of making gas, which consists in forcing air under any required pressure through a tube or conduit into an oil pocket of an oil and gas bearing vein or stratum, thence through or in contact with the oil contained in said pocket and through the vein or stratum to adjacent wells, the said wells being located at different points and connecting at their lower ends with said gas and oil bearing stratum, thus serving to carburet the air in its passage and to form an artificial gas, the said gas then passing under pressure through the several wells to a main or distributer to which they are connected, substantially as described.

3. A gas producing apparatus consisting of an air tube the lower end of which extends into an oil-bearing vein or stratum, means for delivering air under pressure to said air tube, and discharge wells or conduits located at different points and connecting at their lower ends with said vein or stratum and at their upper ends with a gas main or distributer, substantially as and for the purpose set forth.

In testimony whereof we affix our signatures in presence of two witnesses.

WILLIAM HECKERT.
WILLIAM P. ROWLAND.

Witnesses:
JOHN ROTH,
F. B. ANDREWS.